(12) United States Patent
Lendi

(10) Patent No.: US 7,834,570 B2
(45) Date of Patent: Nov. 16, 2010

(54) METHOD AND DEVICE FOR OPERATING AN ACTUATING ELEMENT

(75) Inventor: Dominic Lendi, Ebertwil (CH)

(73) Assignee: Siemens Schweiz AG, Zurich (CH)

( * ) Notice: Subject to any disclaimer, the term of this patent is extended or adjusted under 35 U.S.C. 154(b) by 430 days.

(21) Appl. No.: 11/441,872

(22) Filed: May 26, 2006

(65) Prior Publication Data

US 2006/0267534 A1 Nov. 30, 2006

(30) Foreign Application Priority Data

May 27, 2005 (EP) .................................. 05011437

(51) Int. Cl.
*H02P 3/00* (2006.01)
(52) U.S. Cl. .................. 318/466; 318/445; 318/560
(58) Field of Classification Search ................ 318/445, 318/466, 560
See application file for complete search history.

(56) References Cited

U.S. PATENT DOCUMENTS

| | | | | |
|---|---|---|---|---|
| 4,831,509 A | * | 5/1989 | Jones et al. ................... 700/90 |
| 5,250,765 A | * | 10/1993 | Mizuno et al. ............... 187/316 |
| 5,433,512 A | * | 7/1995 | Aoki et al. ...................... 303/3 |
| 5,594,175 A | * | 1/1997 | Lyon et al. ..................... 73/593 |
| 5,621,304 A | * | 4/1997 | Kiuchi et al. ................. 322/18 |
| 5,734,245 A | * | 3/1998 | Terashima et al. .......... 318/453 |
| 5,828,193 A | * | 10/1998 | Furuta ................... 318/400.08 |
| 5,829,335 A | | 11/1998 | Ewald et al. |
| 5,886,416 A | * | 3/1999 | Arai .......................... 290/40 C |
| 6,084,370 A | * | 7/2000 | Moller ......................... 318/560 |
| 6,167,873 B1 | * | 1/2001 | Kataoka ................. 123/568.24 |
| 6,278,249 B1 | * | 8/2001 | Fitzgibbon et al. .......... 318/268 |
| 6,326,751 B1 | * | 12/2001 | Mullet et al. ................. 318/434 |
| 6,744,231 B2 | * | 6/2004 | Fitzgibbon et al. .......... 318/286 |
| 6,897,630 B2 | * | 5/2005 | Murray et al. ............... 318/434 |
| 7,000,392 B2 | * | 2/2006 | Greentree ..................... 60/602 |
| 7,107,126 B2 | * | 9/2006 | Maistre et al. ............... 700/275 |
| 7,426,829 B2 | * | 9/2008 | Greentree ..................... 60/602 |

FOREIGN PATENT DOCUMENTS

| | | |
|---|---|---|
| DE | 41 07 860 A | 9/1992 |
| EP | 0 050 960 A | 5/1982 |
| EP | 0 851 163 A | 7/1998 |
| EP | 1 015 800 B | 7/2000 |

\* cited by examiner

*Primary Examiner*—Walter Benson
*Assistant Examiner*—David S Luo
(74) *Attorney, Agent, or Firm*—Maginot, Moore & Beck

(57) ABSTRACT

A method for operating an actuating element (30) comprises the following method steps: controlling the rotational frequency of an electric motor (1) to a constant value, calculating an estimate ($F_E$) for the actuating force (F) acting on the actuating element, comparing the estimate ($F_E$) with a predetermined limiting value, and detecting a current position of the actuating element (30) for the predetermined limiting value and assigning the detected position to a final position stored in a travel model. An actuating drive under the control of force and operating according to this method is low in noise and energy-efficient and can therefore be used, in particular, even to operate a battery-fed radiator valve driven in a wireless fashion.

12 Claims, 3 Drawing Sheets

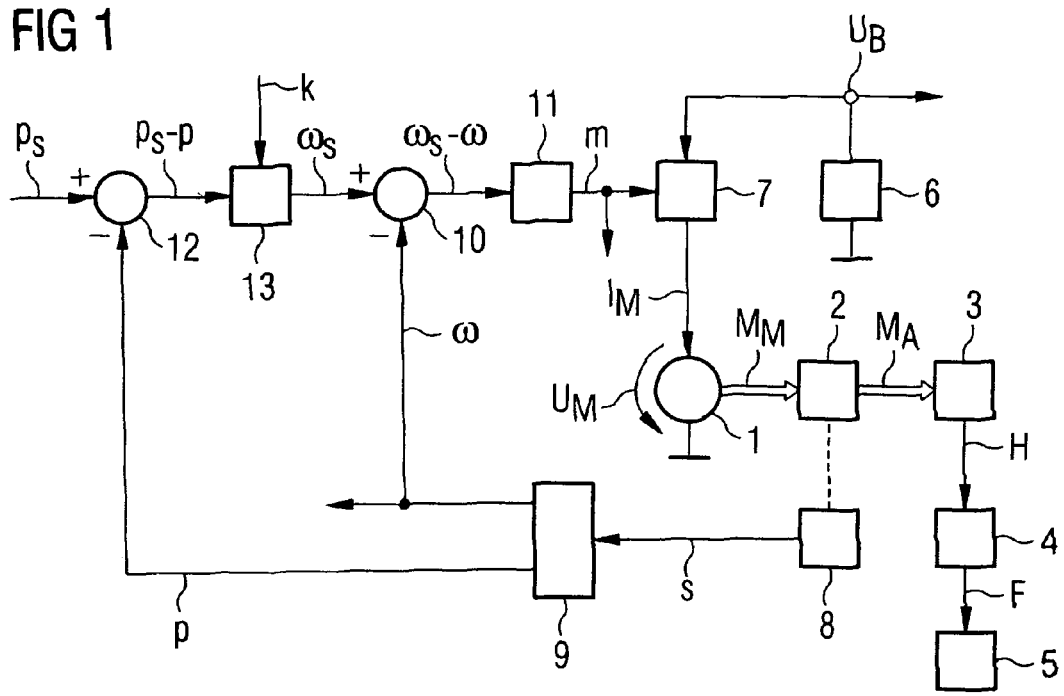
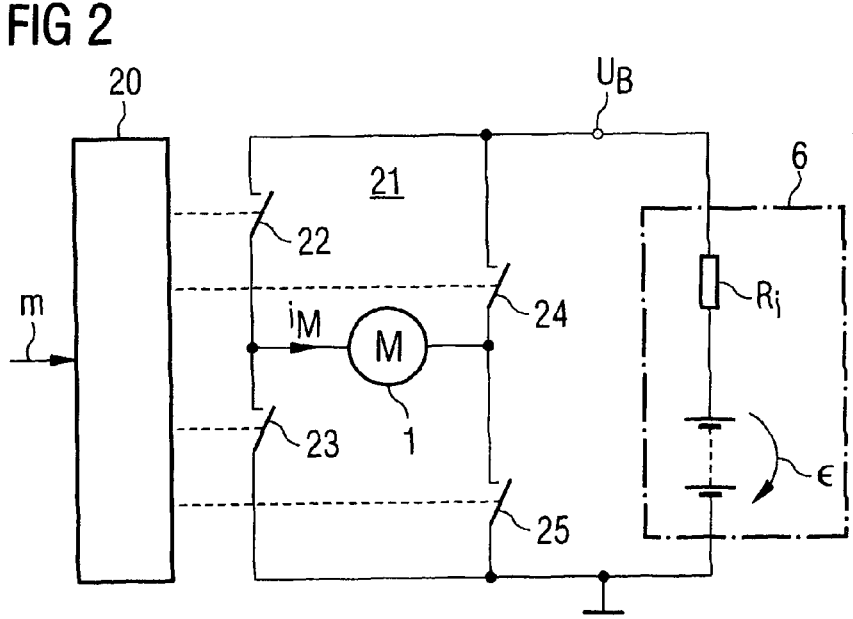

METHOD AND DEVICE FOR OPERATING AN ACTUATING ELEMENT

The invention relates to a method for operating an actuating element and to an actuating drive for carrying out the method in accordance with the preambles of claims 1 and 8.

The method according to the invention is low in noise and energy efficient and is used advantageously in valve drives for determining the closing point of a valve. However, such methods can generally be used in actuating drives in order to determine a mechanical stop of an actuating element, or to detect actuator blockades. A method according to the invention can be used, in particular, in an actuating drive whenever an actuator is to be operated under the control of force, with low noise and in an energy efficient fashion; the invention can thus be used advantageously in heating, ventilation, refrigeration and air conditioning, for example in a radiator valve that is remotely controlled in a wireless fashion.

DE 41 07 860 A1 discloses a method for detecting the closing position of a valve in which a current rise in an electric drive motor is detected. Furthermore, it is known from EP 0 050 960 A or from EP 1 015 800 A, for example, to evaluate a drop in the speed of an electric drive motor in order to detect the closing position of a valve.

It is proposed in EP 1 015 800 A to move a valve in the closing direction in conjunction with a constant motor voltage, and to stop the motor given a certain speed drop and to calculate the closing point. In the event of a battery feed, the regulation thereby required for the feed voltage of the motor can lead to a substantial shortening of the battery service life.

It is the object of the invention to specify an alternative method for operating an actuating element with the aid of which a final position of the actuating element, or a blocking of the actuating drive can be detected, and to carry out which little energy is required, and which can therefore be used effectively, in particular, even in battery-operated actuating drives. Furthermore, the aim is to provide an actuating drive for operating an actuator with the aid of which the method can be carried out.

The said object is achieved according to the invention by the features of claims 1 and 8.

Advantageous refinements follow from the dependent claims.

Exemplary embodiments of the invention are explained in more detail below with the aid of the drawing, in which:

FIG. 1 shows a block diagram of a control device of an actuating drive,

FIG. 2 shows a block diagram relating to the mode of operation of a motor driver module.

Figure 3A:
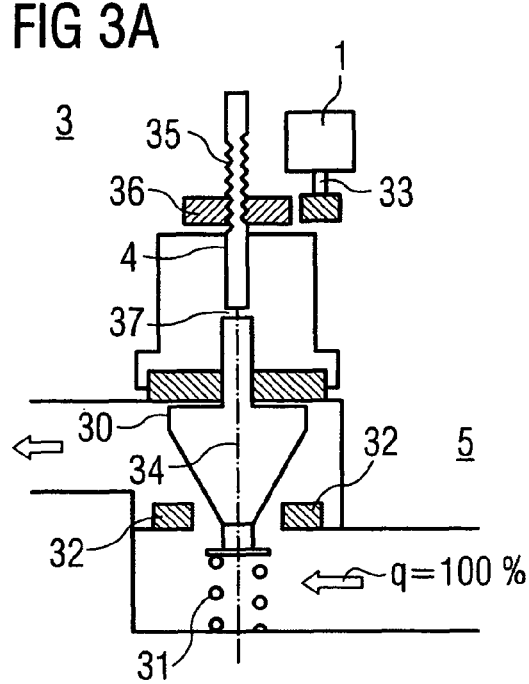
FIG. 3 shows states of an actuator.

Denoted by numeral 1 in FIG. 1 is an electric motor that is coupled to a transformation element 3 via a gear unit 2. A turning moment $M_M$ generated by the electric motor 1 is converted by the gear unit 2 into a drive torque $M_A$ transmitted to the transformation element 3. The transformation element 3 transforms the rotary movement generated by the electric motor 1 into a longitudinal movement with a travel H. Owing to the longitudinal movement, a plunger 4 acts on an actuator 5 with an actuating force F. Here, the actuator 5 is a valve with a closing body on which the plunger 4 acts. The valve is typically a continuously adjustable valve in a heating or cooling water circuit, for example a radiator valve.

The electric motor 1 is fed via a motor driver module 7 connected to a voltage source 6.

A sensor device 8 for detecting a rotary movement is arranged at the gear unit 2. A signal s generated by the sensor device 8 is fed to a calculation module 9, for example. A speed signal ω and a position signal p are advantageously generated in the calculation module 9 with the aid of the signal s.

A control device of an actuating drive for the actuator 5 has an inner closed loop and, advantageously, also an outer closed loop. The inner closed loop leads from the sensor device 8 via the speed signal ω, converted by the calculation module 9, and a first comparing device 10 via a first control module 11 to the motor driver module 7. The outer control loop leads from the sensor device 8 via the position signal p, converted by the calculation module 9, and a second comparing device 12 via a second control module 13 to the first comparing device 10, and from there via the first control module 11 to the motor driver module 7. At the second comparing device 12, a desired position signal $p_S$ of the actuating element is advantageously fed in as command variable.

In an advantageous exemplary embodiment of the actuating drive, the electric motor 1 is a DC motor, and the motor driver module 7 has a driver unit 20 (FIG. 2) and a bridge circuit 21, connected to the battery voltage $U_B$, for driving the electric motor 1. Four electronic switches 22, 23, 24 and 25 of the bridge circuit 21 can be driven by the driver unit 20. The duration and the polarity of a current $I_M$ through the electric motor 1 can be controlled from the driver unit 20 by means of corresponding states of the four switches 22, 23, 24 and 25. The driver unit 20 can advantageously be driven via a control signal m.

The control signal m is, for example, a signal whose pulse width can be modulated by the first control module 11.

The driver unit 20 is, for example, an integrated module, while the electronic switches 22, 23, 24 and 25 are implemented, for example, by MOS field effect transistors.

The motor driver module 7 is fundamentally to be adapted in design to a selected motor type, a suitable motor type being selected depending on what is required of the actuating drive, and an electronic commutating circuit adapted to the motor type being used instead of the bridge circuit 21, for example.

Figure 3B:
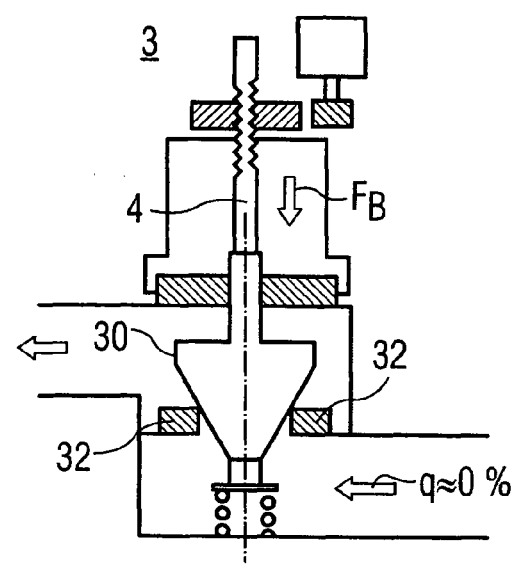
Figure 3C:
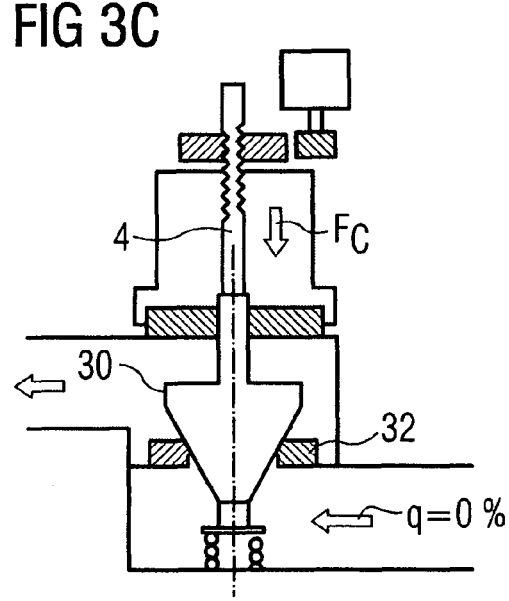

The actuator 5 illustrated in simplified form in FIGS. 3a, 3b and 3c is, for example, a valve having a closing body 30 that can be used as actuating element and can be moved toward a valve seat 32 via the plunger 4 against the force of a spring 31. Depending on the direction of rotation of a drive spindle 33 of the electric motor 1, the plunger 4 can be moved to and from on a longitudinal axis 34 of the closing body 30. Here, the transformation element 3 is an external thread 35, formed on the plunger 4, connected to an internal thread formed on a gearwheel 36.

The valve is illustrated in FIG. 3a in an open state, and so the closing body 30 is in a first final position, and a possible flow rate q for a fluid is 100%. The plunger 4 is also in a final position, an air gap 37 being formed between the plunger 4 and the closing body 30. Particularly when the valve drive can be mounted as universal drive on different valve types, individually achievable final positions will not correspond exactly for closing body and valve drive. It is advantageous to define common final positions of the valve drive and of the closing body after mounting in a calibration method, and to store them advantageously in a travel model in the actuating drive.

In FIG. 3b, the plunger 4 acts with an actuating force $F_B$ on the closing body 30, which rests on the valve seat 32 in the state illustrated. In this state, the flow rate q is approximately 0%, the valve being virtually closed.

In the state of the valve illustrated in FIG. 3c, the plunger 4 acts with a larger actuating force $F_C$—referred to the state illustrated in FIG. 3b—on the closing body 30 such that the closing body 30 is pressed into the valve seat 32. The valve seat 32 is made here, for example, from an elastic material that is deformed given the appropriately large actuating force $F_C$ of the closing body 30. In this state, the flow rate q is 0%, the valve being tightly closed.

Figure 4:
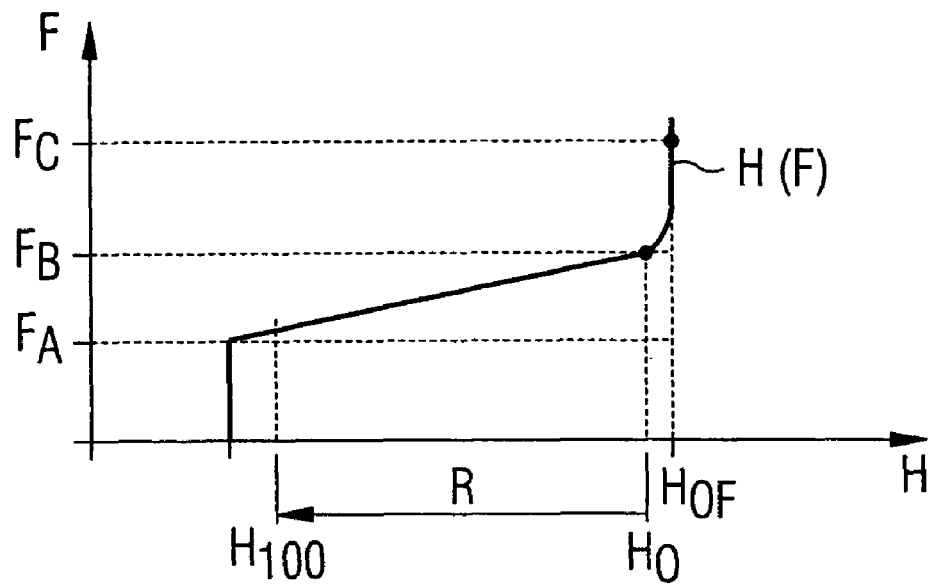
FIG. 4 shows a diagram relating to the profile of an actuating force.

A travel model of a valve is illustrated in FIG. 4 as a fundamental profile H(F). The profile H(F) shows the relationship between the travel H of the closing body 30 and the actuating force F applied to the closing body 30. Down to a minimum value $F_A$, the closing body 30 remains in the first final position illustrated in FIG. 3a. In order for the closing body 30 to be able to move toward the valve seat 32, the plunger 4 working against the spring 31 must overcome an approximately linearly increasing actuating force F. Depicted in the diagram at a certain value $F_B$ of the actuating force is an associated reference value $H_0$ of the travel. The reference value $H_0$ corresponds to a state of the actuator for which the closing body 30 functioning as actuating element reaches the valve seat 32. An additional travel beyond the reference value $H_0$ toward a shutoff value $H_{OF}$ requires the actuating force F to be increased beyond the value $F_B$ toward the value $F_C$ in a strongly disproportionate fashion. However, the disproportionate increase in the actuating force F also requires a sharp increase in the instantaneous power of the electric motor 1 and thus a correspondingly high energy consumption.

In an advantageous control method, in which the flow rate q is to be controlled with the aid of the actuator 5, the reference value $H_0$ is as far as possible not exceeded if the aim is a minimum energy consumption of the actuating drive, which is advantageously to be the aim in the case of an energy supply by means of a battery.

In an advantageous calibration method for an actuator that has an actuating element with at least one mechanically blocked final position, a force provided by the actuating drive, or a turning moment provided by the actuating drive is advantageously detected and, once a predetermined value of the force or of the turning moment has been reached, the current position of the actuating element is detected and stored as mechanical final position of the actuator or of the actuating element, and taken into account in a control method.

The calibration method is initiated, for example, via a start signal k fed to the second control module 13 (FIG. 1). The rotational frequency of electric motor 1 during the calibration method is advantageously held constant at a low value by comparison with a normal operation, this being done by appropriately adapting the speed setpoint $\omega_s$ generated by the second control module 13.

If, for example, the actuator is a thermostat valve that is open in the idle state and whose travel H behaves in principle as illustrated in FIG. 4 as a function of the actuating force F, the closing body is advantageously moved beyond the reference value $H_0$ of the travel only in the calibration method.

A control range R (FIG. 4) stored in the travel model of the actuating drive is advantageously fixed as a function of the determined reference value $H_0$. The control range R for the exemplary thermostat valve therefore comprises final positions, useful for control, at $H_0$—that is to say closed, or flow rate q≅0% and $H_{100}$—that is to say open, or flow rate q=100%.

The information of the signals supplied by the sensor device 8 (FIG. 1) enables a calculation of the current rotational frequency of the electric motor 1 and of the movement of the plunger 4. It is advantageous to store in the calculation module 9 a travel model in which important parameters such as a current position of the closing body, final positions of the closing body 30 and a current speed, preferably the current rotational frequency of the electric motor 1 or, if necessary, the current speed of the closing body 30 are available.

The sensor device 8 preferably comprises a light source and a detector unit tuned to the spectrum of the light source, the light source being directed onto an optical pattern moved by the electric motor 1 such that with the electric motor 1 running light pulses reach the detector unit. The optical pattern is, for example, a disk arranged at the gear unit 2 and having optically reflecting zones, or having holes or teeth which are designed in such a way that a signal from the light source is modulated by the moving optical pattern.

However, it is also possible in principle for the sensor device 8 to be implemented differently, by means of an inductively operating device, for example.

In the second comparing device 12, an error signal $(p_s-p)$ is formed from the desired position signal $p_s$ and the position signal p determined by the calculation module 9, and led to the second control module 13. A command variable for the first comparing device 10 is generated in the second control module 13. The command variable is advantageously a speed setpoint $\omega_s$. In the first comparing device 10, an error signal $(\omega_s-\omega)$ is formed from the speed setpoint $\omega_s$ and the speed signal $\omega$ determined by the calculation module 9, and led to the first control module 11. The control signal m for the motor driver module 7 is generated in the first control module 11 with the aid of the error signal $(\omega_s-\omega)$.

The inner control loop having the first control module 11 keeps the speed of the electric motor 1 constant. Consequently, rotating elements of the gear unit 2 mechanically coupled to the electric motor 1 and of the transformation element 3 are also controlled to constant rotational frequencies in each case in order to neutralize their moments of inertia. Controlling the electric motor 1 to a constant rotational frequency is attended by the advantages that a speed-dependent noise level of the actuating drive is also constant, and can be optimized by suitable selection of the speed setpoint $\omega_s$. Furthermore, the said speed control is associated with the advantage that self induction of electric motor 1 and moments of inertia of rotating elements of the actuating drive need not be taken into account in the calculation of a current estimate $F_E$ for the actuating force F.

Figure 5:
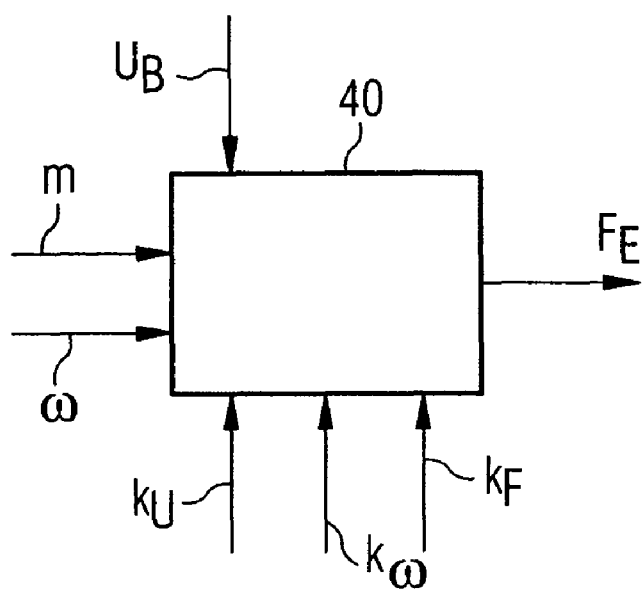
FIG. 5 shows a computing module for calculating the actuating force.

One final position of an actuating element can be reliably determined when the actuating element is moved toward the final position, and in the process the current estimate $F_E$ for the actuating force F is calculated repeatedly by a computing module 40 (FIG. 5) of the actuating drive and is compared with a predetermined limiting value.

In a first variant, the estimate $F_E$ can be calculated only approximately using a linear formula A with the aid of the control signal m applied to the motor driver module 7 and of the battery voltage $U_B$. The product formed from the control signal m, the current value of the battery voltage $U_B$ and a first constant $k_U$ is reduced by a second constant $k_F$:

$$F_E = U_B \times k_U \times m - k_F \qquad \{\text{Formula A}\}$$

Owing to the fact that when calculating the estimate $F_E$ the speed signal $\omega$ attributed to the first comparing device 10 is also used in addition to the control signal m, a formula B yields an improved variant in which the estimate $F_E$ can be more accurately calculated. The speed signal $\omega$ is multiplied by a third constant $k_\omega$ and the resulting product is subtracted from the estimate $F_E$. The mathematical description of the drive model, and thus the formula B for the improved calculation of the estimate $F_E$ therefore runs:

$$F_E = U_B \times k_U \times m - k_\omega \times \omega - k_F \quad \{\text{Formula B}\}$$

The formula B for calculating this estimate $F_E$ is built up in an optimized fashion with the three constants for an implementation suitable for microprocessors. It goes without saying that a suitable estimate of the actuating force can be calculated with the aid of formula B by mathematical conversion, for example associated with an increase in the number of constants used.

The three constants $k_U$, $k_\omega$ and $k_F$ can be determined with little outlay such that the estimate $F_E$ can be calculated with sufficient accuracy for determining the final position of the actuating element.

The three constants $k_U$, $k_\omega$ and $k_F$ take account of characteristic values or properties of the electric motor 1, the motor driver module 7, the gear unit 8 and the transformation element 3.

The computing module 40 comprises a data structure advantageously stored in a microcomputer of the actuating drive, and at least one program routine, which can be executed by the microcomputer, for calculating the estimate $F_E$. In order to calculate the estimate $F_E$, the current battery voltage $U_B$ is input, for example via an analog input of the microcomputer, in each case.

In an exemplary implementation of the computing module 40, the properties of the motor driver module 7 are taken into account by the first constant $k_U$, in particular, while it is chiefly characteristic values of electric motor 1 such as, for example, motor constant and DC resistance that are taken into account by the second constant $k_\omega$. The gear unit 8 is taken into account by the third constant $k_F$. Furthermore, the efficiency of the actuating drive is taken into account when calculating the estimate $F_E$ by having it flow into each of the three constants $k_U$, $k_\omega$ and $k_F$.

The invention claimed is:

1. Method for operating a closing body arranged on a valve and whose position can be moved from an electric motor toward a mechanical stop via a mechanical gear device with the aid of an actuating force acting on the closing body, it being possible to feed the electric motor via an electronic motor driver module, having the following method steps:
   controlling the rotational frequency of the electric motor to a constant value using closed loop control,
   calculating an estimate for the actuating force,
   comparing the estimate with a predetermined limiting value, and
   detecting a current position of the closing body for the predetermined limiting value and assigning the detected position to a final position stored in a travel model;
   wherein controlling the rotational frequency further comprises controlling the rotation frequency of the electric motor to the constant value using a control signal fed to the motor driver module, and calculating the estimate further comprises calculating the estimate using the control signal.

2. The method as claimed in claim 1, wherein the rotational frequency of the electric motor is additionally detected and is used in calculating the estimate.

3. The method as claimed in claim 1, wherein the current value of a battery voltage is detected and is used in calculating the estimate.

4. The method as claimed in claim 1, wherein the control signal is a pulse width modulated signal.

5. The method as claimed in claim 1, wherein the control signal has a characteristic that is controllably adjustable through a value range from 0% to 100%.

6. The method of claim 1, wherein the electric motor is a variable speed motor.

7. An actuating drive assembly having a microcomputer, an electric motor that can be controlled via a motor driver module, and a mechanical gear device configured to be driven by an electric motor, the actuating drive assembly comprising a valve operating drive and configured to
   control the rotational frequency of the electric motor to a constant value using closed loop control,
   calculate, using a computing module, an estimate for the actuating force exerted on a valve, the computing module stored in the actuating drive,
   compare the estimate with a predetermined limiting value, and
   detect a current position of the actuating element for the predetermined limiting value and assign the detected position to a final position stored in a travel model.

8. The actuating drive as claimed in claim 7, further comprising a sensor device, arranged on the gear device which is configured to generate a sensor signal from which the speed or rotational frequency of the electric motor can be determined.

9. The actuating drive as claimed in claim 8, further comprising a first comparing device configured to generate an error signal from a speed setpoint and a speed signal generated from the sensor signal by a calculation module, and wherein a first control module is configured to generate the control signal using at least the error signal.

10. The actuating drive as claimed in claim 9, further comprising a second comparing device configured to generate an error signal from a desired position signal and a position signal generated from the sensor signal by the calculation module, and wherein a second control module is configured to generate the speed set point using at least the error signal.

11. The actuating drive as claimed in claim 7, wherein the actuating drive stores a variable travel model of the actuating element.

12. The actuating drive assembly of claim 7, further comprising a plunger operably coupled to the mechanical gear device.

* * * * *